United States Patent [19]

Kramer

[11] Patent Number: 5,337,387
[45] Date of Patent: Aug. 9, 1994

[54] METHOD FOR THE CONTINUOUS PROCESSING OF HERMETIC FIBER OPTIC COMPONENTS AND THE RESULTANT FIBER OPTIC-TO-METAL COMPONENTS

[75] Inventor: Daniel P. Kramer, Centerville, Ohio

[73] Assignee: The United States of America as represented by the United States Department of Energy, Washington, D.C.

[21] Appl. No.: 67,919

[22] Filed: May 27, 1993

[51] Int. Cl.⁵ ............................................. G02B 6/00
[52] U.S. Cl. ................................... 385/76; 156/380.8
[58] Field of Search ............... 385/76, 86; 156/380.8, 156/624

[56] References Cited

U.S. PATENT DOCUMENTS

| | | | |
|---|---|---|---|
| 4,349,692 | 9/1982 | Davis et al. | 174/52 H |
| 4,450,033 | 5/1984 | Little | 156/380.8 |
| 4,715,673 | 12/1987 | Noro et al. | 350/96.20 |
| 4,722,137 | 2/1988 | Ellenberger | 29/841 |
| 4,766,954 | 8/1988 | Bierlein et al. | 156/624 |

OTHER PUBLICATIONS

"Development of Hermetic, Fiberoptic Components" by Kramer et al, EG&G Mound Report MLM-ML-9-0-44-0003, Date: Apr. 30, 1990.

*Primary Examiner*—Akm E. Ullah
*Attorney, Agent, or Firm*—Russell D. Elliott; James H. Chafin; William R. Moser

[57] ABSTRACT

Hermetic fiber optic-to-metal components and method for making hermetic fiber optic-to-metal components by assembling and fixturing elements comprising a metal shell, a glass preform, and a metal-coated fiber optic into desired relative positions and then sealing said fixtured elements preferably using a continuous heating process. The resultant hermetic fiber optic-to-metal components exhibit high hermeticity and durability despite the large differences in thermal coefficients of expansion among the various elements.

16 Claims, 2 Drawing Sheets

METHOD FOR THE CONTINUOUS PROCESSING OF HERMETIC FIBER OPTIC COMPONENTS AND THE RESULTANT FIBER OPTIC-TO-METAL COMPONENTS

The United States Government has rights in this invention pursuant to Contract. No. DE-AC04-88DP43495 between the United States Department of Energy and EG&G Mound Applied Technologies.

BACKGROUND OF THE INVENTION

1. Field of the Invention

This invention relates generally to fabrication of hermetic components containing lengths of optical fibers and, more particularly, to a method for continuously fabricating hermetic fiber optic-to-metal components and to the resultant hermetic fiber optic-to-metal components themselves.

2. Description of the Related Art

Fiber optics are used in a wide variety of applications ranging from telecommunications to medical technology and energetic components. Because of their unique structure, optical fibers are capable of highly accurate transmission of light, which is relatively unaffected by interference, diffusion, and other signal dehancing phenomena. In order for optical fibers to function at their optimum potential, however, they must be structurally intact and free of scratches, cracks, or leaks.

Optical fibers consist of a core material that is surrounded by a cladding. The difference between the indexes of refraction of the core and cladding materials (which, in some cases, are simply different types of fused silica glass) allows the optical fiber to function. Most commercially available optical fibers, in addition, have an external "buffer". The buffer is a thin coating (usually composed of a plastic, other polymer, or metal) which is applied to the fiber in order to protect it from being scratched during handling and to limit the amount of water than can come into contact with the fiber. Scratching or contact with water can deleteriously affect both the optical properties and the strength of the glass fiber. In addition to shielding the fiber's surface, the buffer also operates to help maintain the high tensile strength and the bending capability of the glass optical fibers.

A number of fiber optic applications require that one terminus of the fiber be located in an environment isolated from the other terminus. This implies the use of a connector or coupling device which serves as the point of communication between the distinct environments. Oftentimes, it is necessary or desirable for the point of communication between the environments to be completely sealed except for the presence of the optical fiber. Herein arises the need for a satisfactory method to hermetically seal optical fibers within metal fittings.

Fabrication of hermetic fiber optic-to-metal components has until recently been impractical due to a number of factors. Principal among these is the large thermal expansion mismatch between the very low coefficient of expansion of the optical fibers (most commonly made of fused silica glass) and the high coefficient of expansion of the metal shell to which the optical fibers are attached. This difference can cause severe stressing of the fiber optic components, especially where fabrication methods use application of heat, which, in turn, can cause undesirable cracks and leaks in the optical fibers.

Another problem with existing sealing methods concerns the use of polymer-buffered optical fibers. Methods for hermetically sealing fiber optic components typically involve the use of heat in the formation of the seal between the fiber and other elements of the fiber optic component. Heat deterioration of polymer buffer coatings, however, is one of the principal problems associated with creating seals involving optical fibers. Such deterioration, caused by the buffer burning off at the high temperatures required for most sealing processes, can result in the optical fibers having low tensile strengths and low bending strengths relative to undamaged fibers. Typically, the polymer buffer coating on an optical fiber will begin to burn off at about 220° C. and will be over 90 percent removed at about 450° C. These temperatures may be significantly below the temperature needed to form a high-quality seal.

Metal buffered optical fibers have been developed to overcome many of the problems associated with using polymer buffered fibers. Until now, however, attempts to fabricate hermetic fiber optic components using metal-coated optical fibers have been successful only with non-continuous "batch" heating operations. Formation of satisfactory fiber optic-to-metal seals could only be accomplished by using a batch furnace or flame heating. Due to the nature of these batch operations, throughput of processed parts is limited, and both processing time and the cost of batch-processed parts are increased relative to continuously-processed parts. For these reasons, existing batch techniques for fabrication of hermetically sealed fiber optic-to-metal components are commercially undesirable.

Disclosed here is a new method for fabricating hermetic fiber optic-to-metal components using continuous heat processing, such as with a belt furnace, and metal-coated fibers. The method of the present invention greatly enhances the commercial feasibility of fabricating hermetic fiber optic components, and the hermetic fiber optic components generated using the invention method are of notably high quality. In particular, they have been shown to exhibit significantly less stress damage and crack formation than hermetic fiber optic components made using other techniques.

SUMMARY OF THE INVENTION

Accordingly, it is an object of the present invention to provide a method for fabricating hermetic fiber optic-to-metal components that uses metal-coated optical fibers in a continuous heating process operation.

It is another object of the present invention to provide a method for such fabrication that uses presently available means for continuous heating, such as a belt furnace.

It is yet another object of the present invention to provide a method for such fabrication which comprises the steps of fixturing elements comprising a metal shell, a glass preform and a metal-coated optical fiber in the precise relative positions they are desired to occupy in the finished component and sealing said fixtured elements using a continuous heating process.

It is yet another object of the present invention to provide a method for such fabrication which allows in-furnace processing of hermetic components that may contain lengths of optical fibers exceeding furnace dimensions.

It is yet another object of the present invention to provide a method for such fabrication wherein the fixtured elements are sealed at temperatures ranging fro about 700° C. to about 1000° C.

It is yet another object of the present invention to provide a method for such fabrication wherein the fixtured elements are sealed at a temperature of about 840° C.

It is yet another object of the present invention to provide a method for such fabrication wherein the metal coating affixed to the optical fiber allows the optical fiber assembly to absorb the large strains produced during the high-temperature sealing and the subsequent rapid cooling that are characteristic of a continuous heating process.

It is yet another object of the present invention to provide a fiber optic component which is hermetically sealed and is fabricated using the principles of the methods described above.

Additional objects, advantages and novel features of the invention will become apparent to those skilled in the art upon examination of the following description or may be learned by practice of the invention. The objects and advantages of the invention may be realized and attained by means of the methods, instrumentalities and combinations particularly described in the appended claims.

The objects of the invention have been fulfilled by providing a method of making hermetic fiber optic-to-metal components, which method comprises the steps of assembling and fixturing elements which include a metal shell, a glass preform, and a metal-coated optical fiber into desired relative positions and thereafter heating the elements to such a temperature as to allow the glass preform to soften, flow, and create a hermetic seal between the optical fiber and the metal shell. The objects of the present invention are further achieved by use of a continuous heating process to achieve the softening of the glass preform. In the preferred embodiment such continuous heating is achieved by means of a belt furnace. Finally, to achieve the objects, and in accordance with the purposes of the present invention as embodied and broadly described herein, the invention further comprises the hermetically-sealed fiber optic-to-metal components, themselves, which are fabricated using the methods described.

DETAILED DESCRIPTION OF THE INVENTION

Fabrication of hermetic fiber optic-to-metal components requires that both strength and hermeticity characterize the seal obtained between a relatively small-diameter optical fiber and a relatively larger diameter metal shell. The seal must be substantially leakproof with a helium leak rate of $<1 \times 10^{-8}$ cm$^3$/sec, and be of sufficient strength to preserve successful functioning of the fiber optic component. As discussed above, existing methods for hermetically sealing fiber optic components may be costly, and risk damage to either the seal or the optical fiber resulting in a poor quality component. The present invention combines principles of continuous heating with use of particularly well-suited materials to overcome the shortcomings of the existing technology.

As mentioned above, optical fibers may be coated with a metal buffer rather than a polymer buffer. The metal buffer allows higher use temperatures than those feasible for polymer-buffered fibers. Although use temperatures for metal-buffered fibers are significantly below temperatures associated with belt furnace or other continuous heating operations, the strength of the metal-buffered fibers, unlike that of polymer-buffered fibers, remains substantially unaffected even at temperatures required to achieve hermetic sealing. These metal-buffered fibers can be harmlessly subjected to temperatures that would totally degrade the physical properties (i.e., tensile and bending strength) of polymer-coated fibers.

For purposes of the present invention, the preferred metal coating on the optical fiber is a gold coating, or some other metal which exhibits gold-like ductility characteristics during the sealing and cooling cycles. As will be more fully explained below, ductility of the metal fiber buffer is desirable because it allows the coating to act as a protective cushion and absorb some of the strain associated with rapid cooling which otherwise might cause the fiber or seal to crack or otherwise be damaged.

Figure 1:
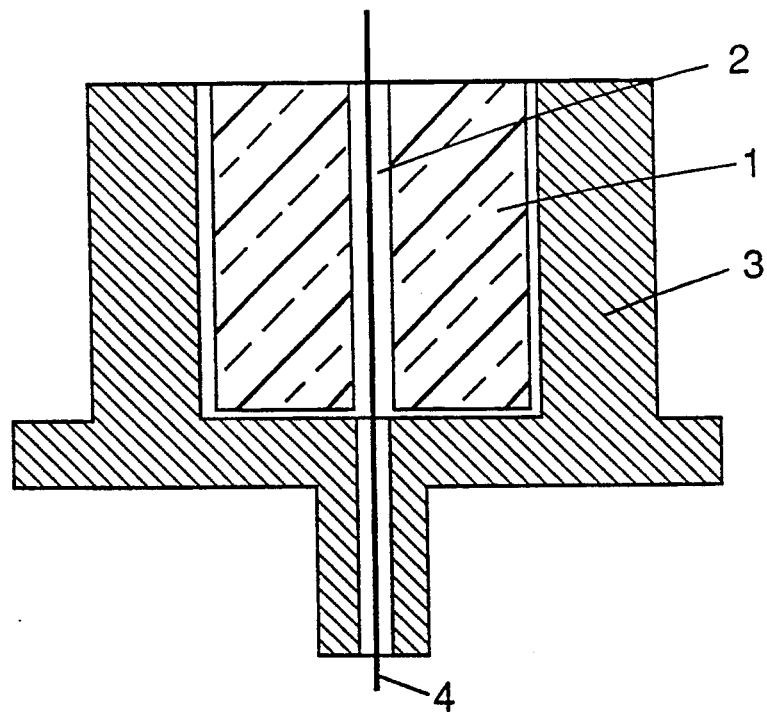
FIG. 1 is a schematic cross-sectional view of an assembled fiber optic-to-metal component prior to heating.
Figure 2:
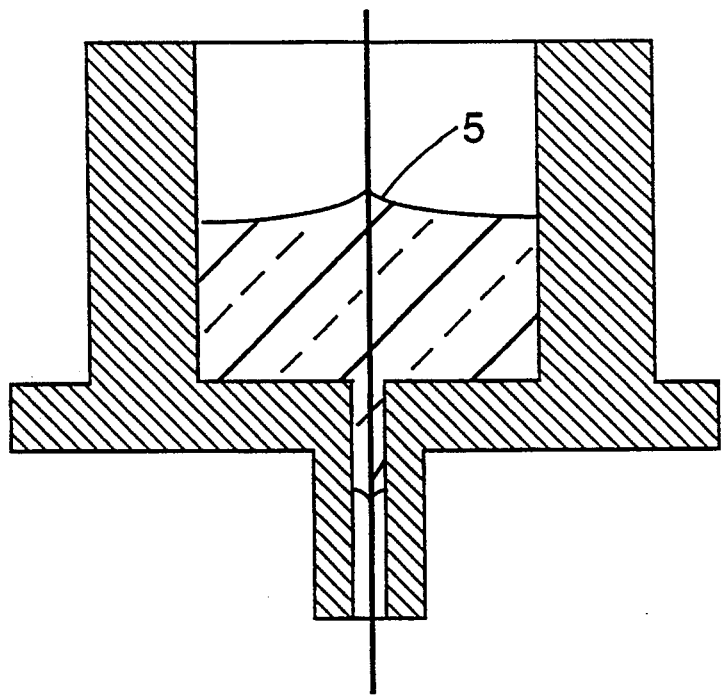
FIG. 2 is a schematic cross-sectional view of an assembled fiber optic-to-metal component following heating and creation of hermetic seal.
Figure 3:
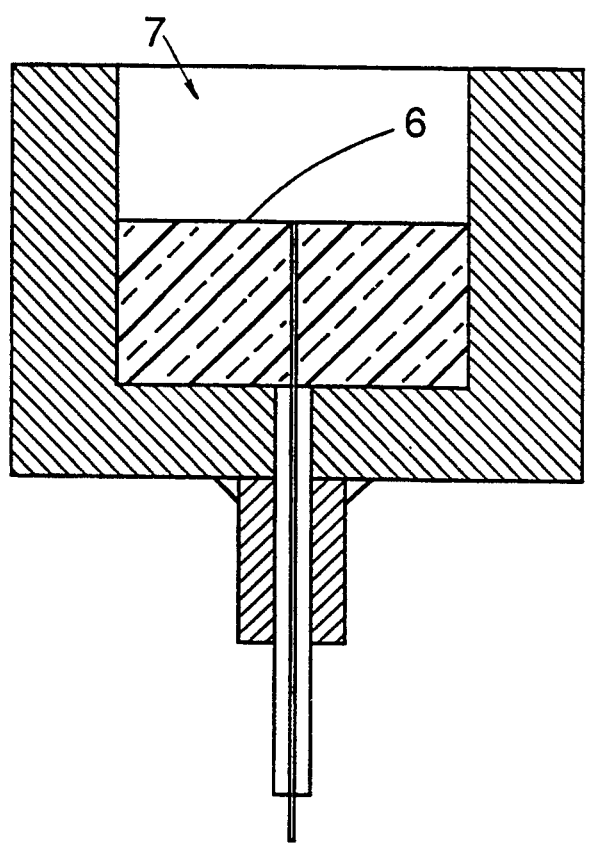
FIG. 3 is a schematic cross-sectional view of a fiber optic-to-metal component into which a terminal surface has been machined to facilitate mating or splicing to form an operational engagement.

Referring to FIG. 1, prior to the sealing operation, a glass preform (1) containing an axial hole (2) or consisting of split halves is positioned within a metal shell (3) or fitting. A metal-coated optical fiber (4) is then positioned within the glass preform in the desired location for the finished component. Sealing is then accomplished, as depicted in FIG. 2, by heating the entire assembly in a belt furnace or other continuous heating furnace such that the glass preform softens (5) and flows to form a seal between the inner metal-coated optical fiber and the outer metal shell, which, when the component is cooled, yields hermeticity with a helium leak rate of less than $1 \times 10^{-8}$ cm$^3$/sec. FIG. 3 shows a component that has a surface (6) machined flat. This surface can be utilized for mating of connections to other components or the volume formed by machining (7) can be filled with an energetic material to function as an explosive device.

The glass preform should have a softening point lower than that of both the metal-coated optical fiber and the metal shell. The softening point of the glass preform should also be below that of the furnace temperature so that the glass preform can soften and seal the optical fiber to the metal shell. Additionally, the glass preform should have a coefficient of thermal expansion between that of the optical fiber and the metal shell. Preferably, the glass preform coefficient of thermal expansion is at or near the midpoint between the thermal expansion coefficients of the optical fiber and the metal shell to minimize the stress gradients in the seal.

In the present invention, the selected elements—the metal shell, the glass preform, and the metal-coated fiber optic—are first fixtured into their desired relative positions. This allows the elements to be precisely placed in the final position that they will occupy in the finished component, providing the advantage of obtaining finished components with close positional tolerances. In many cases, direct fiber placement of the elements that make up the component greatly simplifies the manufacturing of the component, since tolerances can be closely maintained by fixturing the optical fiber prior to sealing.

In the preferred embodiment, the glass preform consists of a multicomponent silicate glass and, as mentioned above, the fiber optic metal buffer is gold or another similarly ductile metal. After the glass preform has been positioned, the optical fiber is then positioned inside the glass preform. These steps may be done in any order. An alignment device may be used to maintain these elements in their desired relative positions during the sealing operation.

Once fixturing is completed, the unit is ready for the sealing operation in a continuous heating process. In the preferred embodiment, the continuous heating process is effected with a belt furnace. The specific temperature should be sufficiently high to achieve a proper seal and yield high quality components, but should not be so high as to decrease the ductility of the metal coating on the optical fiber and cause crack formation in the finished component. The belt furnace should be operated at a temperature of about the softening point of the glass preform: preferably, between about 700° C. and about 1000° C., and optimally at about 840° C. for a multicomponent silicate glass. The residence time of the optical fiber component as it passes through the belt furnace should be of sufficient duration both to effectuate the sealing process and to allow the glass to anneal. If the glass is not allowed to remain at an elevated temperature for a long enough period of time, the resultant glass seal may contain strains that can compromise its hermetic integrity and durability. Preferably, the residence time within the furnace is about two hours.

Upon emerging from the belt furnace, the sealed component may be cooled relatively rapidly compared with other types of heating processes. This relatively fast cooling cycle is a characteristic of a belt furnace and tends to result in a build-up of stresses in the finished component due to the large differences in the thermal expansion coefficients of the various elements being sealed. In the prior art, these stresses have resulted in crack formation and highly stressed or cracked seals that weaken the finished component.

A unique and unexpected attribute of the present invention, however, is that the ductile metal coating operates as an excellent compliant layer which tends to relieve stresses between the metal shell and the optical fiber that might otherwise build up during the cooling cycle and compromise the integrity of the fiber or the seal, itself. As indicated above, gold is especially well suited as the optical fiber coating due to its high ductility and ability to relieve stresses formed in the seal during the fabrication process.

The method of the present invention, wherein are used metal-coated optical fibers and a continuous heating furnace, such as a belt furnace, allows, for the first time, fabrication of fiber optic-to-metal components in a quick, commercially viable fashion, without crack formation or the build-up of retained deleterious stresses in the fiber optic component. The process of the present invention permits fabrication of fiber optic components economically with respect to both time and money since these components can now be fixtured rapidly and then, for example, placed directly on the continuous belt for the sealing operation.

In accordance with another aspect of the invention, a class of hermetically-sealed fiber optic to metal components fabricated using the invention method described herein is provided. In the preferred embodiment, the components provided exhibit high hermeticity and durability together with minimal to nonexistent damage done to the optical fiber as a result of the fabrication process. These components comprise a metal shell, a metal-coated optical fiber, and a glass sealant, assembled, heated, and cooled according to the method described in this disclosure.

Without further elaboration, it is believed that one skilled in the art can, using the preceding description, utilize the present invention to its fullest extent. The following example is to be construed as merely illustrative and not limitative of the remainder of the disclosure in any way whatsoever.

EXAMPLE

A hermetic fiber optic-to-metal component is made using the continuous heat processing operation of the present invention. This component is fabricated using a 304L stainless steel shell, a gold-coated 100/140-micron step index optic fiber, and a multicomponent silicate glass preform. The 304L stainless steel shell has a coefficient of thermal expansion of about $180 \times 10^{-7}$ cm/cm/°C. (at 20°–500° C.), the glass preform has a coefficient of thermal expansion of about $100 \times 10^{-7}$ cm/cm/°C. (at 20°–500° C.), and the metal-coated optic fiber has a coefficient of thermal expansion of about $10 \times 10^{-7}$ cm/cm/°C. (at 20°–500° C.).

The elements are fixtured by first positioning the 304L stainless steel shell. The glass preform is then placed inside the metal shell and the gold-coated 100/140-micron step index optical fiber is fed through the hole in the glass preform. After this is accomplished, the fixtured elements are ready for sealing. The fixtured elements are then placed on the belt of a belt furnace operating at approximately 840° C. After about two hours, the component assembly exits the heating portion of the belt furnace and is allowed to cool to room temperature.

Results obtained using the technique of this example show that although stresses occurred in the glass seal portion of the component assembly due to temperature gradients experienced by the glass seal during the relatively rapid cooling phase, crack formation did not occur. The integrity of the seal and the optical fiber was preserved due to the stress relief provided by the gold coating on the fiber. After sealing, the component was determined to be crack-free, with a helium leak rate of less than $1 \times 10^{-9}$ cm$^3$/sec.

Having thus described the invention, it will be obvious to those of ordinary skill in the art that various modifications can be made within the spirit and scope of the present invention. It is intended to encompass all such variations as fall within the spirit and scope of the invention.

I claim:

1. A method for making hermetic fiber optic components comprising the steps of:

fixturing elements comprising a metal shell, a glass preform, and a metal-coated optical fiber into positions relative to each other such that said elements are oriented in positions they will occupy in a finished component;

heating said elements thus fixtured in a continuous heating process such that said glass preform is allowed to soften and flow thereby sealing said elements in the positions in which they were fixtured; and cooling said elements.

2. The method of claim 1 wherein said continuous heating process is a belt furnace.

3. The method of claim 2 wherein said fixtured elements are sealed at a temperature of from about 700° C. to about 1000° C.

4. The method of claim 3 wherein said fixtured elements are sealed at a temperature of about 840° C.

5. The method of claim 4 wherein said fixtured elements are sealed for about two hours.

6. The method of claim 1 wherein the metal coating on said metal-coated optical fiber exhibits ductile characteristics during the sealing process.

7. The method of claim 6 wherein said metal-coated optical fiber is a gold-buffered optical fiber.

8. A method for the fabrication of a hermetic fiber optic-to-metal component from a metal shell, a glass preform, and a metal-coated optical fiber comprising the steps of:

fixturing said metal shell, said glass preform, and said metal-coated optical fiber into a position where said metal-coated optical fiber is surrounded by said glass preform, and said glass preform is surrounded by said metal shell; and sealing said metal shell, glass preform, and metal-coated optical fiber thus fixtured in a continuous heating process in a belt furnace such that said glass preform is allowed to soften and flow, thereby sealing said metal-coated optical fiber within said metal shell, and subsequently allowing said component to cool.

9. A hermetic fiber optic component produced by fixturing elements comprising a metal shell, a glass preform, and a metal-coated optical fiber into positions relative to each other such that said elements are oriented in positions they will occupy in a finished component, heating said elements thus fixtured in a continuous heating process such that said glass preform is allowed to soften and flow, thereby sealing said elements in the positions in which they were fixtured, and cooling said elements.

10. The hermetic fiber optic component of claim 9 wherein said continuous heating process is a belt furnace.

11. The hermetic fiber optic component of claim 10 wherein said fixtured elements are sealed at a temperature of from about 700° C. to about 1000° C.

12. The hermetic fiber optic component of claim 11 wherein said fixtured elements are sealed at a temperature of about 840° C.

13. The hermetic fiber optic component of claim 12 wherein said fixtured elements are sealed for about two hours.

14. The hermetic fiber optic component of claim 9 wherein said metal shell surrounds said glass preform, which in turn surrounds said metal-coated optical fiber.

15. The hermetic fiber optic component of claim 9 wherein the metal coating on said metal-coated optical fiber exhibits ductile characteristics during the sealing process.

16. The hermetic fiber optic component of claim 15 wherein said metal-coated optical fiber is a gold-buffered optical fiber.

* * * * *